July 2, 1929.   W. C. ZAGARINO ET AL   1,719,160
BATTERY CONDITION INDICATOR
Filed May 22, 1928
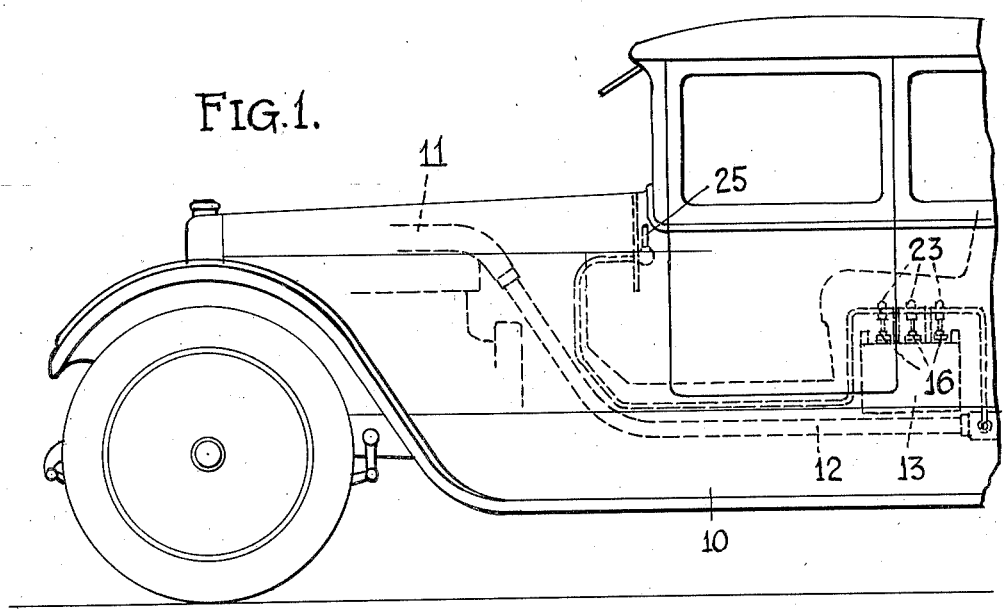
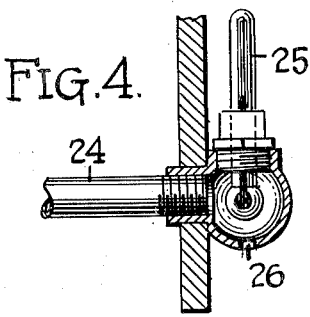
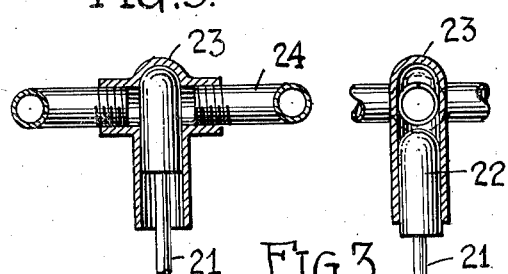
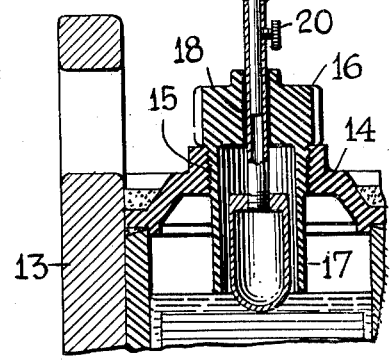
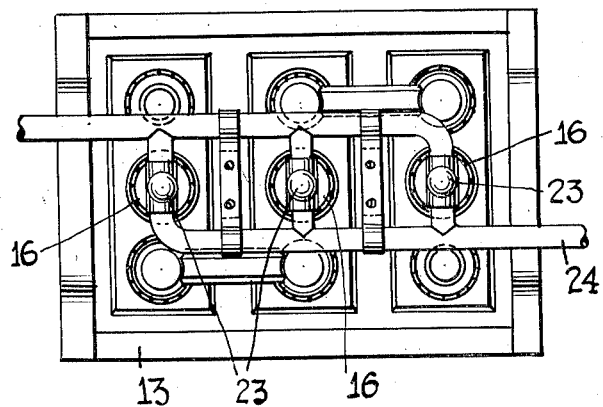
INVENTORS.
WILLIAM C. ZAGARINO.
BY MARSHALL T. McDONALD.
ATTORNEY.

Patented July 2, 1929.

1,719,160

UNITED STATES PATENT OFFICE.

WILLIAM C. ZAGARINO AND MARSHALL T. McDONALD, OF BELLMORE, NEW YORK.

BATTERY-CONDITION INDICATOR.

Application filed May 22, 1928. Serial No. 279,831.

Our invention relates to indicators and more particularly to battery condition indicators for use on automobiles and other automotive vehicles.

The extensive use of storage batteries in automotive vehicles for the starting, lighting, and ignition systems thereof, and the consequent necessity for entrusting the servicing of such batteries to owners or operators unskilled in their care or use, has frequently resulted in injury thereto thru failure to replenish the liquid losses occurring in the battery cell or cells. The necessity of maintaining a sufficiently high level of electrolyte within the battery cell or cells is well known. Any lowering of the electrolyte beyond a predetermined level lessens the operating efficiency of the battery, while a continued drop in the level of the electrolyte will eventually so injure the battery as to render it totally unserviceable. The evaporation of the electrolyte in the battery cell or cells is gradual tho constant and to replenish this loss it has been the practice heretofore to add from time to time a quantity of distilled water. So long as the volume of the electrolyte is held above a predetermined safe level, no injury to the battery occurs. Unfortunately, however, due to the inaccessible location of batteries in automobiles, and to the frequent tendency of owners and operators to refrain from performing a tedious and disagreeable task, the servicing of the battery is either indefinitely deferred or altogether neglected.

The principal object of the present invention is to provide a battery condition indicator by means of which the owner or operator of an automobile is warned automatically and in ample time of the fact that the electrolyte level within the battery cell or cells is approaching or has already reached that level considered dangerous.

A further object of the invention is to provide a battery condition indicator in which floats (one for each battery cell) are provided; the floats, in each instance, having associated therewith a movable or sliding valve, which valve or valves, as the electrolyte level within the battery cell or cells recedes, is or are adapted to open communication between a source of heat and an indicating thermometer; the latter, by the sudden rise or fall of its mercury or other fluid column, indicating to the observer a dangerous battery condition resulting from excess electrolyte loss.

A still further object of the invention is to so organize and arrange the parts comprising the indicator as to admit of the disposition of the indicating thermometer on the dash or instrument board of the vehicle thus equipped.

Other objects and advantages of the invention will be hereinafter pointed out.

In the drawings, wherein like reference characters denote like or corresponding parts, Fig. 1 is a side elevation of a portion of an automobile showing the installation of our invention thereon;

Fig. 2 is a plan view of a multiple cell storage battery with its associated indicator connections;

Fig. 3 is a longitudinal sectional view of a portion of said battery showing the float and valve installation;

Fig. 4 is a fragmentary sectional view of the indicating thermometer, and

Fig. 5 is a fragmentary sectional view of the valve casing and valve.

In the embodiment of the invention selected for illustration, an automobile is indicated at 10. It includes a heat generating power plant 11, an exhaust conduit 12, and a multiple cell storage battery 13, the latter as indicated being supported in the usual manner beneath the driver's seat. Within the top 14 of each cell of the battery 13 a threaded filler opening is provided. The usual vented plug providing a closure for said opening is dispensed with. In lieu thereof a plug 16 is provided. Said plug 16 has formed thereon a sleeve 17 which extends into the battery cell. At its upper end it is provided with an opening 18 thru which a sleeve-like stem 19 is carried. Said stem 19 at its inner end has fastened thereto or formed thereon a suitable float 20 which is adapted to rise and fall within the cell as the level of the electrolyte therein varies.

Fastened to the stem 19 by means of a thumb nut 20 is a rod or stem 21, which at its upper end has fastened thereto a suitable valve 22. This valve (see Figs. 3 and 5) is adapted to slide vertically within a valve casing 23 either attached to or formed as an integral part of a pipe line 24 extending between the exhaust manifold 20 and a thermometer 21 mounted on the dash or instrument board of the automobile.

The pipe line 24 at one end may be either tapped into the manifold 12 or it may be provided with a heat grid (not shown) surrounding said manifold. Normally said pipe line 24 is closed by the valve 22 so that the heat from the manifold cannot pass therethru to the indicating thermometer 25. So long as the level of the electrolyte within the battery cell or cells is maintained at a sufficient height to raise the valve 22 to that position indicated in Fig. 5, the heat entering the pipe line 24 cannot pass beyond said valve. Should said electrolyte level, however, for any reason, fall below a predetermined safe level, the float 22 will correspondingly fall and thru its connection with the valve 22, cause the latter to assume the position indicated in Fig. 3. Thus positioned, the pipe line 24 is open from end to end and the heat therein is allowed to pass entirely therethru where it is liberated by means of an opening 26 formed at the bottom of the thermometer. The heat thus coming in contact with the thermometer will cause the mercury or other fluid column to suddenly rise with the result that the operator is automatically notified of a dangerous battery condition.

In Fig. 2 it will be observed that each cell of the battery is provided with its individual valve structure. It will also be noted that the total number of valves are arranged in series so that the opening of any one of said total number will admit of the passage thru the pipe line of heat sufficient in volume to actuate the indicator. If desired, the pipe line may be insulated to prevent heat dissipation. Moreover, by providing a breakable joint between the hollow stem portion 19 and the rod-like stem portion 21, the plug 16, when the thumb screw 20 is loosened, can be entirely removed for battery refilling purposes. Suitable brackets, if desired, may be provided at opposite ends of the battery box to support the pipe line 24.

A battery condition indicator of the character herein set forth operates automatically the moment the electrolyte level in any given cell falls below a predetermined safe level. It can be installed on automobiles equipped with storage batteries of conventional form. It is positive in operation and dependent entirely upon the generation of heat within the power plant of the vehicle. If the power plant is in operating condition, and it is operated, the operator, due to the convenient location of the indicating thermometer on the instrument or dash board of the automobile, has within his line of vision, at all times, a definite reminder of the fact that the electrolyte level within the storage battery is at a low level and that the battery, in consequence, requires attention.

While we have described our invention in detail in its present preferred embodiment, it will be obvious to those skilled in the art after understanding our invention that various changes and modifications may be made therein without departing from the spirit or scope thereof. We aim in the appended claims to cover all such modifications and changes.

What we claim is:

1. The combination with the heat generating power plant and storage battery of an automotive vehicle, of a battery condition indicator comprising a thermometer, a pipe line extending off from said heat generating power plant to said thermometer, and means operable by and as a result in the fall of the level of the electrolyte within said battery for opening said pipe line to admit of the passage therethru to said thermometer of the heat within said line.

2. The combination, with an automotive vehicle including a heat generating power plant, a storage battery and an instrument board, of a battery condition indicator comprising an indicating thermometer mounted on said instrument board, a pipe line extending off from said heat generating power plant to said thermometer, a valve normally closing said pipe line to preclude the passage therethru of the heat contained therein and originating in said power plant, and means operable by and as a result of the fall in the level of the electrolyte within said storage battery to open said pipe line.

3. The combination with the heat generating power plant and storage battery of an automotive vehicle, of a battery condition indicator comprising a thermometer, a float movable within said battery as the condition of the electrolyte therein varies during use, a pipe line extending off from said power plant to said thermometer, and means responsive in its movement to the movement of said float to open and close said pipe line to thereby admit of or preclude the passage therethru to said thermometer of the heat within said pipe line.

In testimony whereof we hereunto affix our signatures.

WILLIAM C. ZAGARINO.
MARSHALL T. McDONALD.